(12) United States Patent
Bumstead et al.

(10) Patent No.: US 7,899,916 B1
(45) Date of Patent: Mar. 1, 2011

(54) VIRTUAL SERVICE ENDPOINT

(75) Inventors: David Bumstead, San Jose, CA (US); John Burns, Los Altos, CA (US); Fong Liaw, San Jose, CA (US); Jan Medved, Pleasanton, CA (US); John Z. Yu, Santa Clara, CA (US)

(73) Assignee: Brixham Solutions Ltd., Tortola (VG)

( * ) Notice: Subject to any disclaimer, the term of this patent is extended or adjusted under 35 U.S.C. 154(b) by 1032 days.

(21) Appl. No.: 10/677,090

(22) Filed: Sep. 30, 2003

(51) Int. Cl.
*G06F 15/16* (2006.01)
(52) U.S. Cl. ........................ 709/228; 709/227; 709/231
(58) Field of Classification Search ................. 709/227, 709/228, 231
See application file for complete search history.

(56) References Cited

U.S. PATENT DOCUMENTS

| | | | |
|---|---|---|---|
| 5,610,918 A | 3/1997 | Kamo et al. | |
| 5,675,642 A | 10/1997 | Sone | |
| 5,764,750 A * | 6/1998 | Chau et al. | 379/229 |
| 5,905,873 A | 5/1999 | Hartmann et al. | |
| 6,047,002 A | 4/2000 | Hartmann et al. | |
| 6,201,809 B1 | 3/2001 | Lewin et al. | |
| 6,205,152 B1 | 3/2001 | Von Ahnen et al. | |
| 7,065,585 B2 | 6/2006 | Ohyoshi et al. | |
| 7,082,121 B1 * | 7/2006 | Stammers et al. | 370/352 |
| 7,590,143 B2 * | 9/2009 | Daley et al. | 370/466 |
| 2002/0065073 A1 | 5/2002 | Natani et al. | |
| 2003/0081624 A1 | 5/2003 | Aggarwal et al. | |
| 2003/0126195 A1 * | 7/2003 | Reynolds et al. | 709/203 |
| 2004/0120502 A1 * | 6/2004 | Strathmeyer et al. | 379/265.01 |

* cited by examiner

*Primary Examiner*—Barbara N Burgess

(57) ABSTRACT

A system and method are disclosed for establishing a connection between a first endpoint participating in a first protocol and a second endpoint participating in a second protocol. Establishing a connection includes establishing a virtual service endpoint participating in the first protocol on a network device that is connected to the first endpoint and the second endpoint and forwarding to the second endpoint communication directed from the first endpoint to the virtual service endpoint.

21 Claims, 12 Drawing Sheets

ATM Packet Format Carrying Proprietary Information

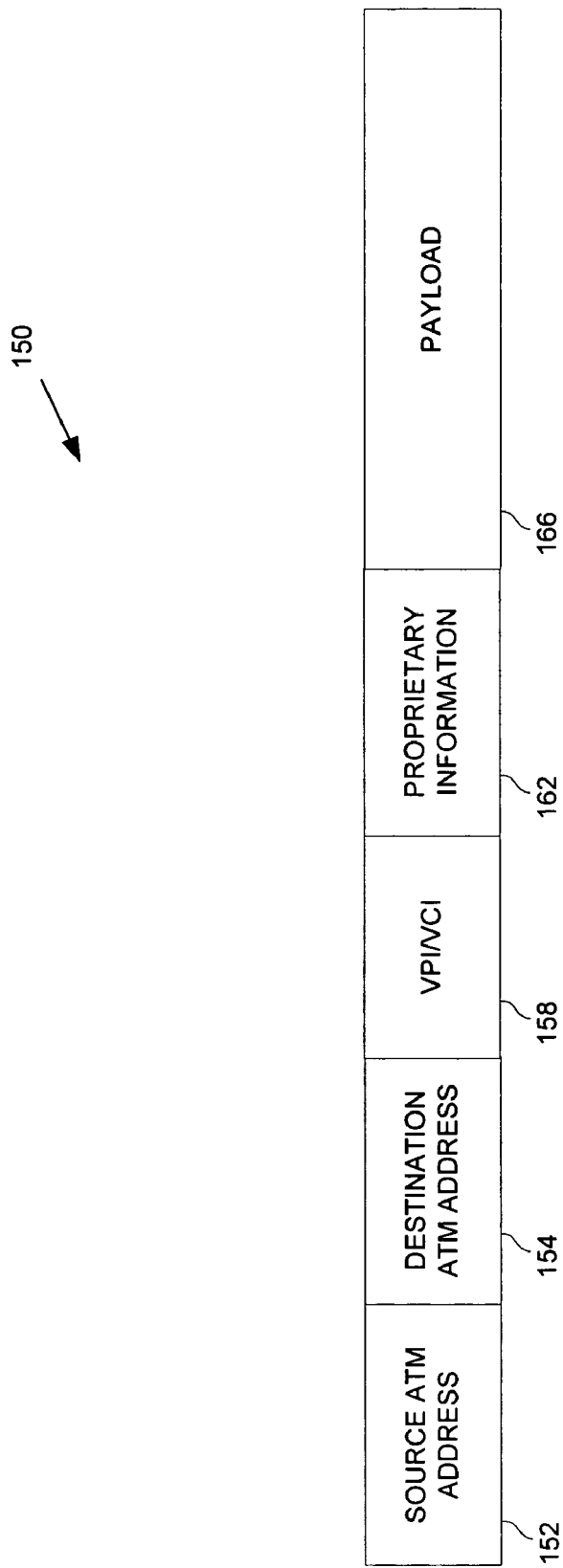
FIG 1B - ATM Packet Format Carrying Proprietary Information

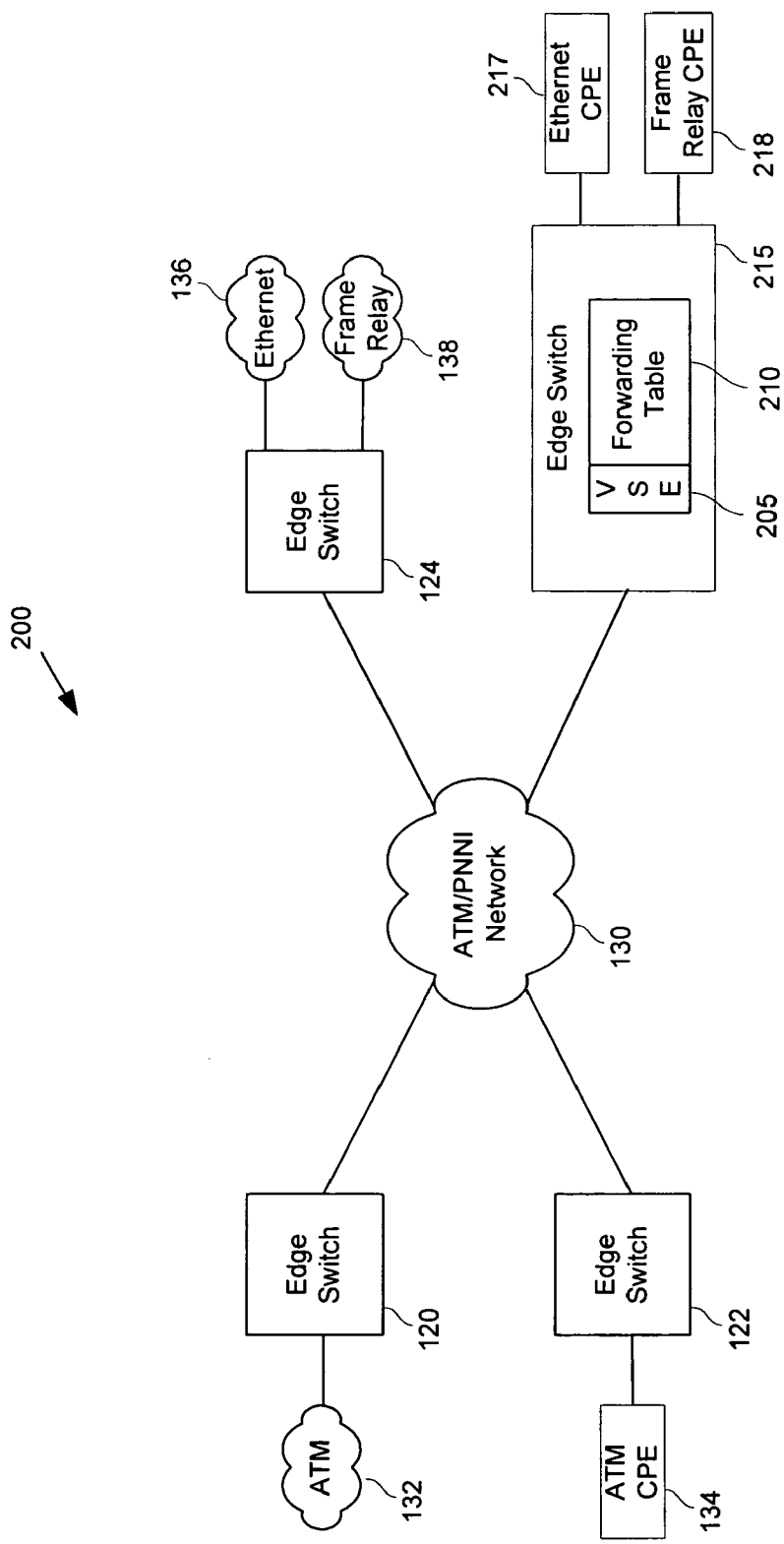
FIG 2A - Edge Switch with VSE

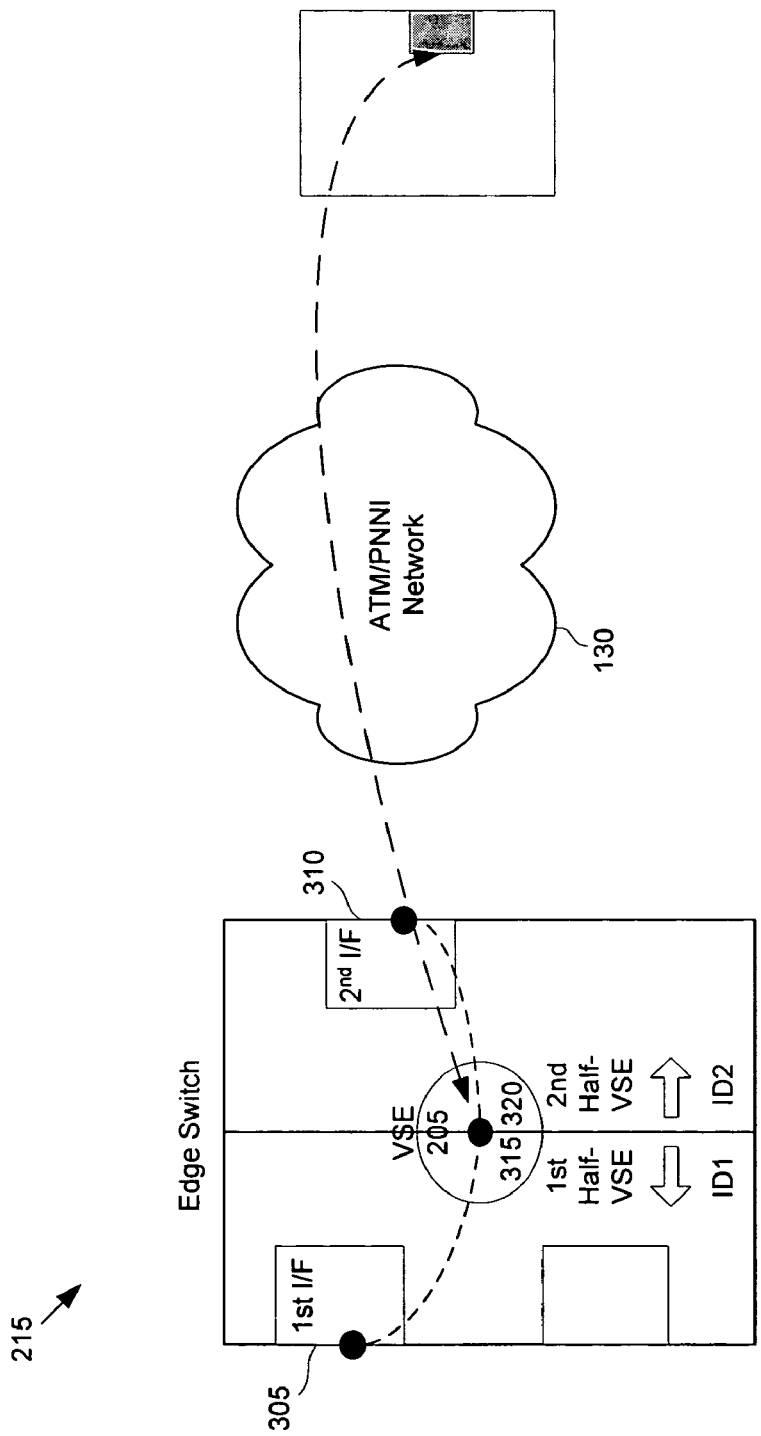
FIG 3A - VSE for Edge Service Interworking Application

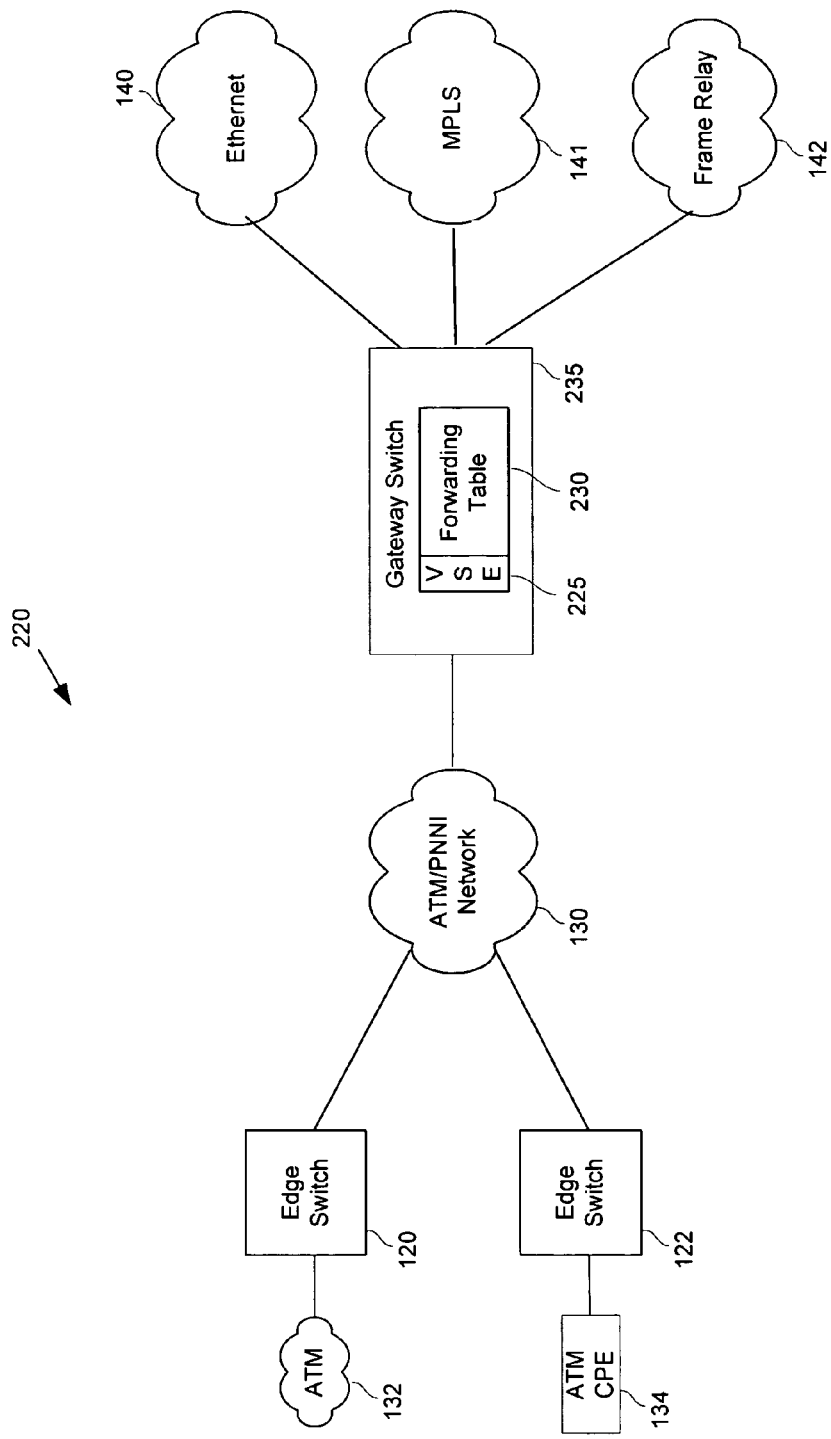
FIG 2B - Gateway Switch with VSE

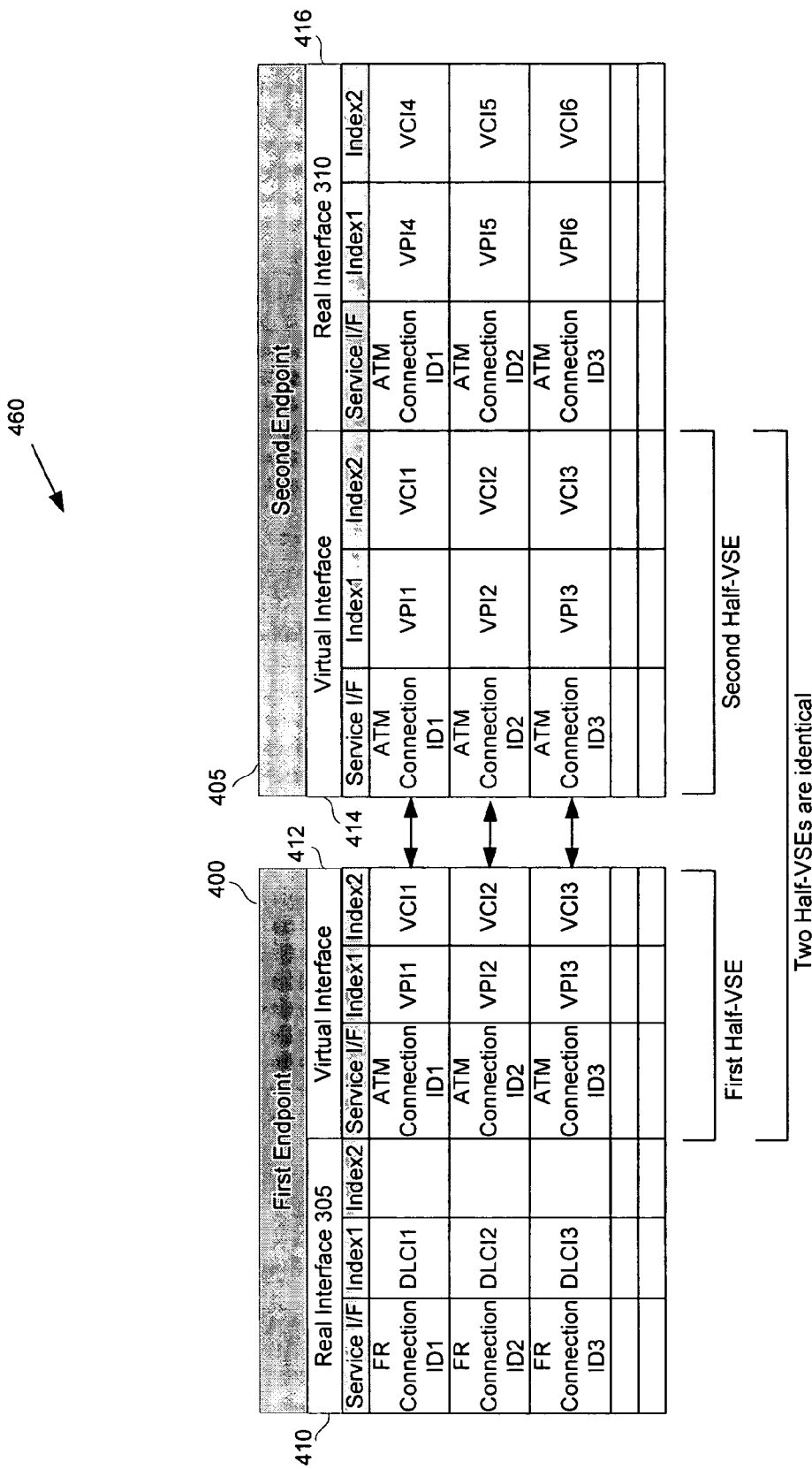
FIG 3B - Forwarding Tables for Edge Service Interworking

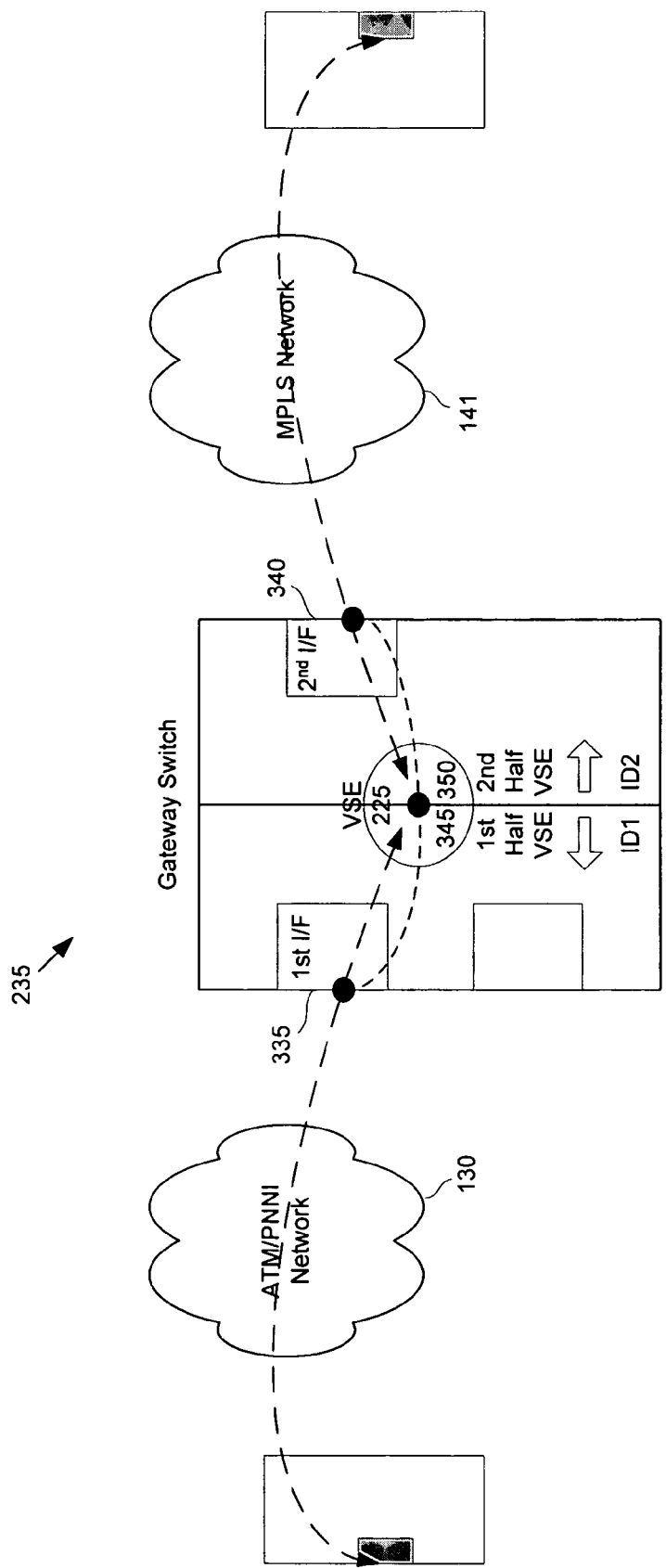
FIG 4A - VSE for Gateway Network Interworking Application

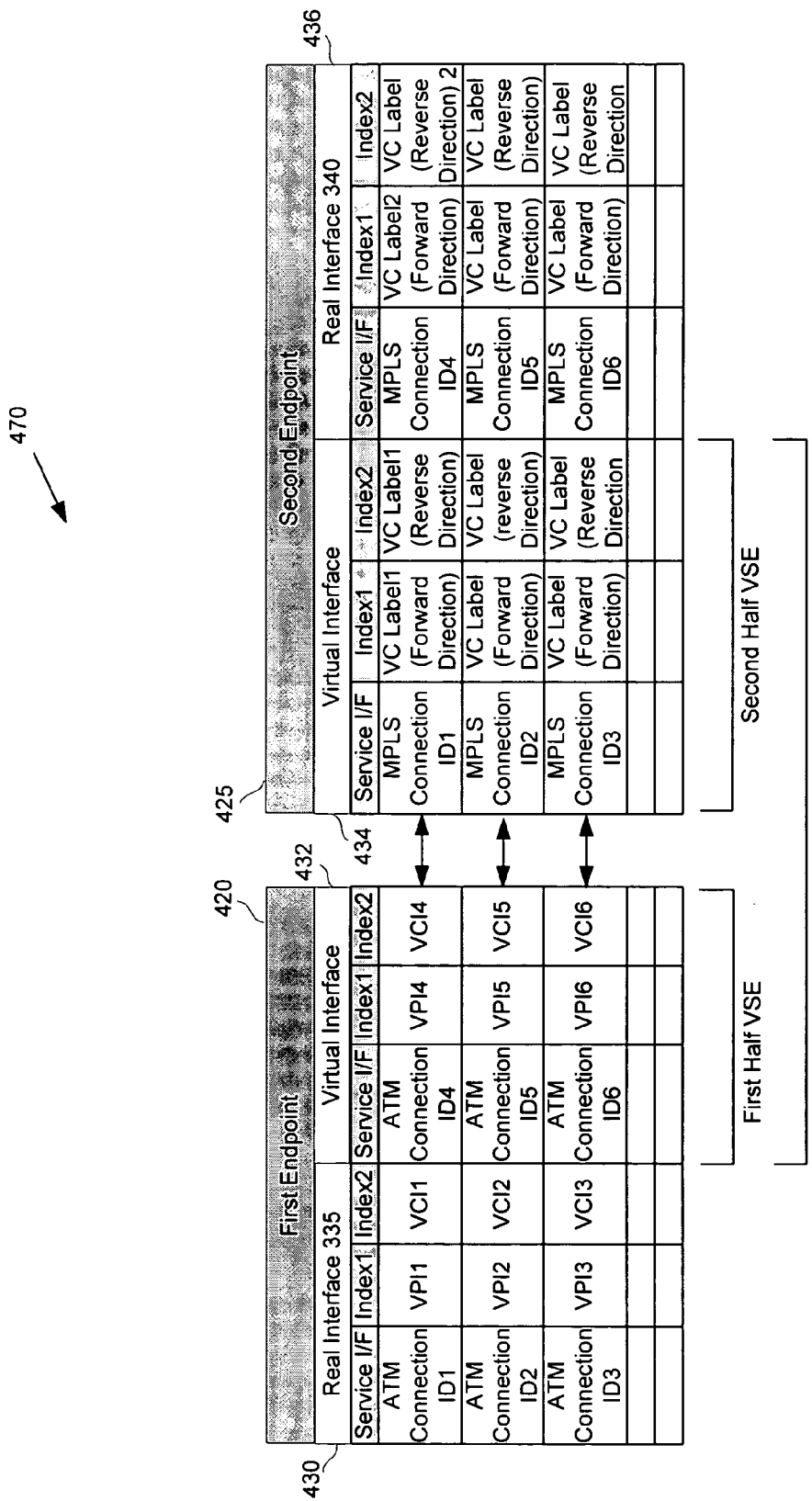
FIG 4B - Forwarding Tables for Gateway Inter-networking

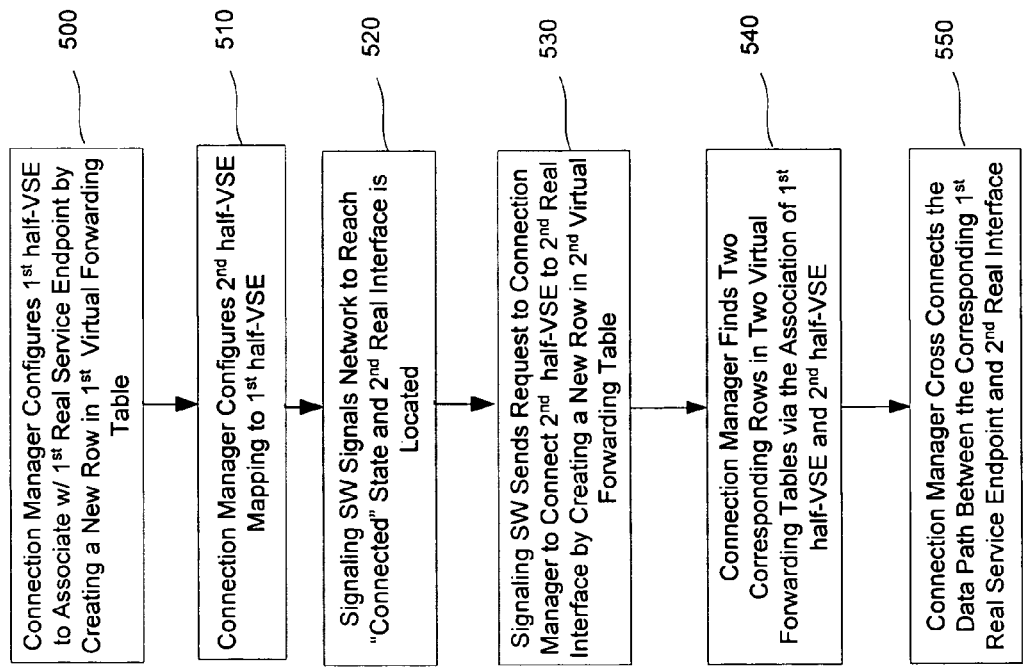
FIG 5 - Establishing a Connection - Edge Service Interworking Application

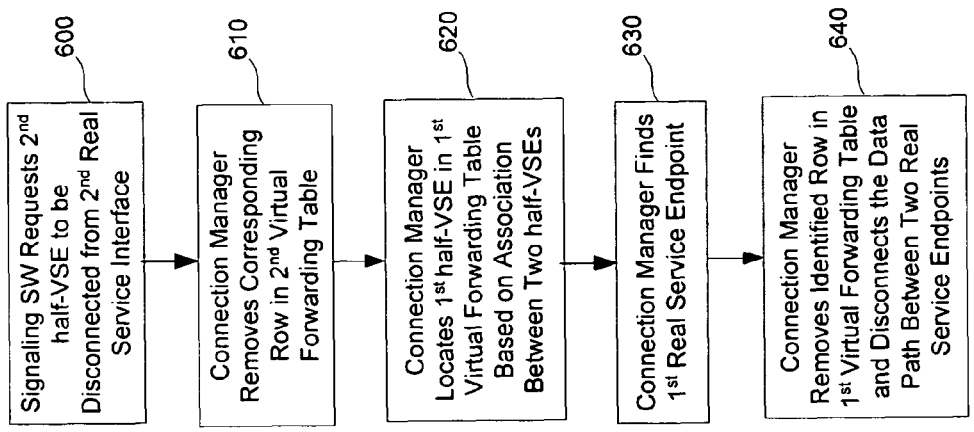
FIG 6 - Releasing a Connection - Edge Service Interworking Application

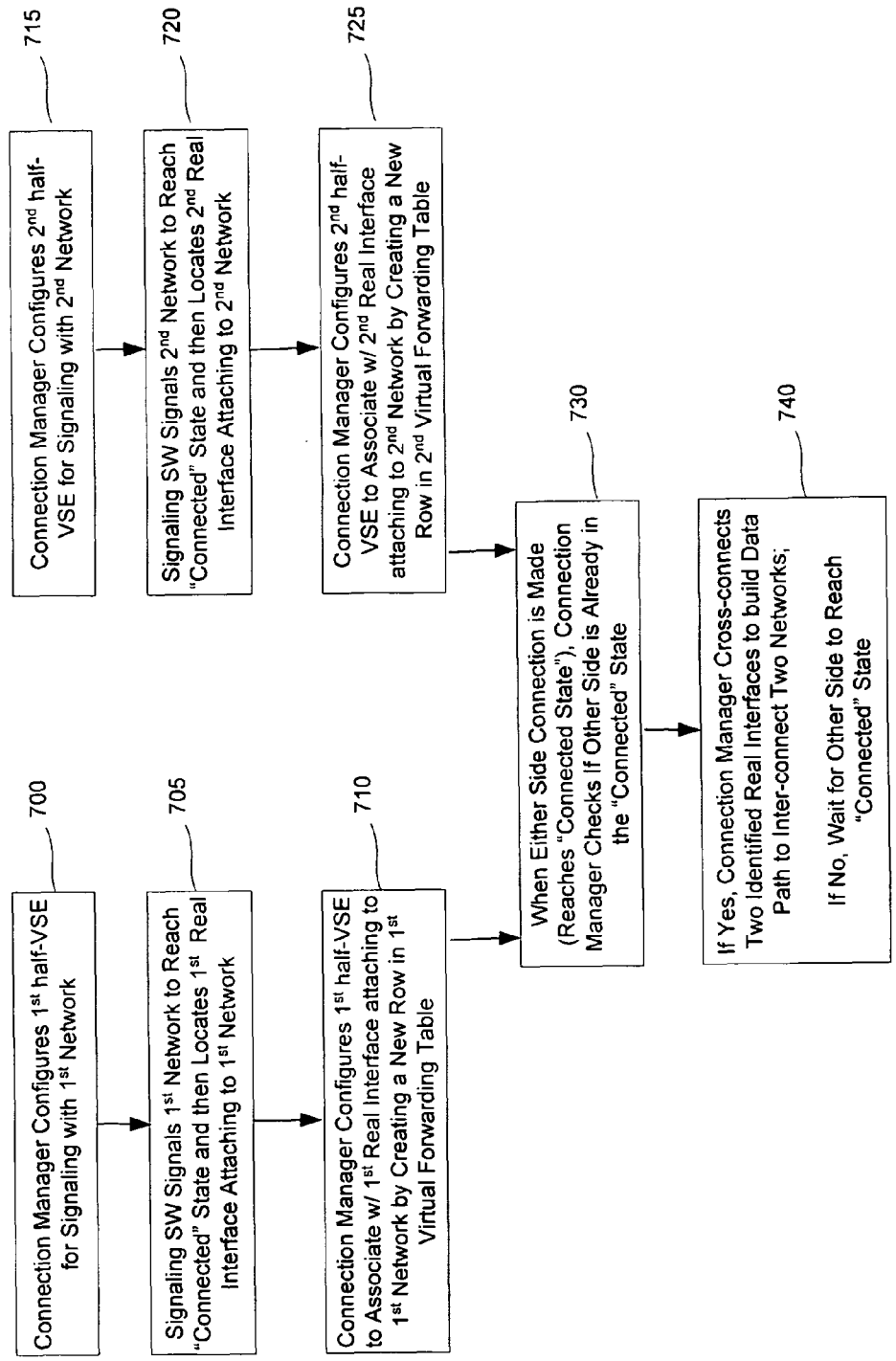
FIG 7 - Establishing a Connection - Gateway Networking Interworking Application

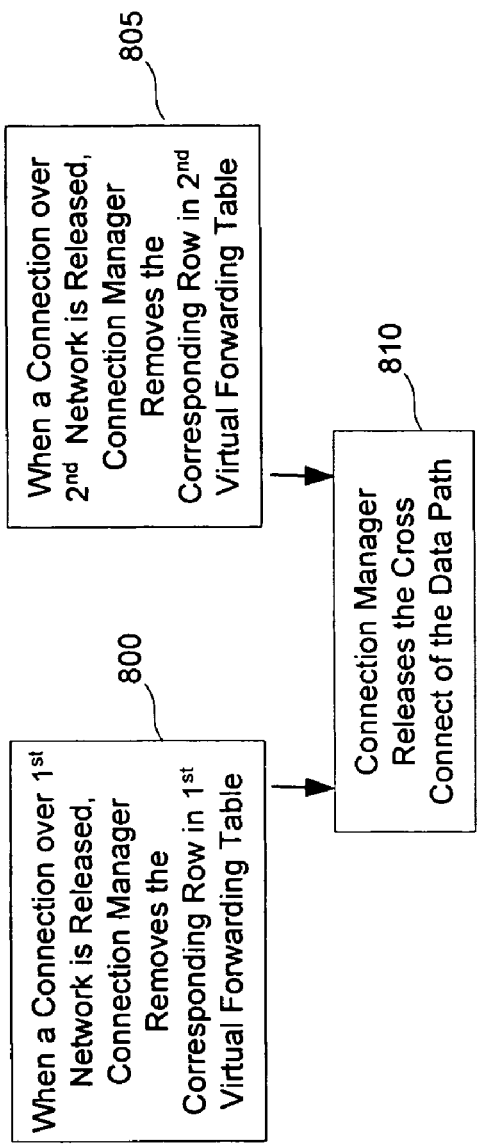
FIG 8 - Releasing a Connection - Gateway Network Interworking Application

VIRTUAL SERVICE ENDPOINT

FIELD OF THE INVENTION

The present invention relates generally to network devices. More specifically, a virtual service endpoint is disclosed.

BACKGROUND OF THE INVENTION

A network switch may exchange data between multiple interfaces that run the same or different protocols: An interface is a physical module in a network switch which connects to customer premises equipment (CPE) or a network trunk, and runs a specific service or network protocol toward the customer side or network side.

FIG. 1A is a network diagram illustrating a service provider's wide-area ATM network 100 providing end-to-end services between customer premises equipment (CPE) or customer networks. The interfaces connecting the edge switches in a service provider's network and CPEs or customer networks define the service demarcation points between customers and the service provider. It is the service provider network's responsibility to interconnect two service demarcation points, or service endpoints, to allow communication between customer's different locations. As shown in FIG. 1A, network edge switches 120, 122, 124, and 126 are each connected to an ATM/PNNI network 130. Switch 120 is connected to a customer ATM network 132 and switch 122 is connected to a customer ATM CPE 134. Switch 124 is connected to a metro Ethernet network 136 and Frame Relay network 138. Switch 126 is connected to Ethernet network 140, MPLS network 141, and Frame Relay CPE 142.

The service endpoints in switch 120 and switch 122 can communicate with each other via standards-based PNNI signaling and routing protocols. For example, for an ATM service endpoint in ATM network 132 to communicate with ATM CPE 134, the ATM service endpoint in ATM network 132 sends PNNI standards-based signaling messages to set up a virtual circuit between the ATM service endpoint in ATM network 132 and the ATM service endpoint in ATM CPE 134.

The service endpoints in switch 120 and switch 126 may not be able to communicate with each other because there is no standards based protocol for signaling and routing between service endpoints running different protocols. Note that the service endpoint in switch 120 is ATM, but the service endpoint in switch 126 is either Frame Relay or Ethernet. These may only be possible if switch 120 and switch 126 are from the same manufacturer, so they may develop some proprietary method of signaling between service endpoints with different protocol types. For example, for an ATM service endpoint in ATM network 132 to communicate with an Ethernet service endpoint in Ethernet network 140, proprietary information may be included in a proprietary header in each packet sent to switch 126

FIG. 1B is a packet format illustrating an ATM packet 150 with proprietary information carried in the packet header. Specifically, packet 150 includes standard ATM header information (152, 154, and 158) and proprietary information 162 to indicate, e.g., the real type of service endpoints. Packet 150 is an example of a packet with proprietary information that may be sent from an ATM service endpoint in ATM network 132 to an Ethernet service endpoint in Ethernet network 140. Switch 126 uses proprietary information 162 to determine to which interface to send the packet for forwarding. The challenge of using proprietary header information or a proprietary encryption method is it requires that the edge switches that communicate with each other share the same proprietary method to connect different types of service endpoints. In general, this means that participating edge switches must agree and understand the proprietary method beforehand, which most likely requires the two edge switches come from the same manufacturer, putting a significant constraint on service providers for introducing new edge switches to meet the need of network growth and expansion. There is a need to allow an edge switch to be inserted into an existing network running standard based signaling/routing protocols, to communicate between the service endpoints on existing edge switches and new service endpoints on the new edge switch which may not be recognizable by the standard signaling/routing protocols. For service providers, this would allow them to introduce new products into its existing network for new service deployment with minimum disruption. For switch vendors, it would also be beneficial to maintain a generic, common service interface in an edge switch, adaptive to the type of networking protocols running in the network the edge switch is connected to, to represent real service endpoints for signaling/routing over the network. This allows common software developed in the edge switch to connect to multiple networks running different networking protocols.

BRIEF DESCRIPTION OF THE DRAWINGS

The present invention will be readily understood by the following detailed description in conjunction with the accompanying drawings, wherein like reference numerals designate like structural elements, and in which:

FIG. 1B is a packet format illustrating an ATM packet 150 with proprietary information carried in the packet header.

FIG. 2A is a block diagram illustrating a network 200 with edge switch 215.

FIG. 2B is a block diagram illustrating a network 220 with a gateway switch 235.

FIG. 3A is a diagram further illustrating edge switch 215 with a VSE 205 for performing edge service interworking.

FIG. 3B is a diagram, in principle, illustrating forwarding table 460 for edge switch 215.

FIG. 4A is a diagram further illustrating gateway switch 235 inter-connecting ATM network 130 and MPLS network 141 via a VSE 225.

FIG. 4B is a diagram, in principle, illustrating forwarding table 470 for gateway switch 235.

FIG. 5 is a flowchart illustrating a method of establishing a connection for an edge switch for a service interworking application.

FIG. 6 is a flowchart illustrating a method of releasing a connection for an edge switch for a service interworking application.

FIG. 7 is a flowchart illustrating a method of establishing a connection for a gateway network interworking application.

FIG. 8 is a flowchart illustrating a method of releasing a connection for a gateway network interworking application.

DETAILED DESCRIPTION

Figure 1A:
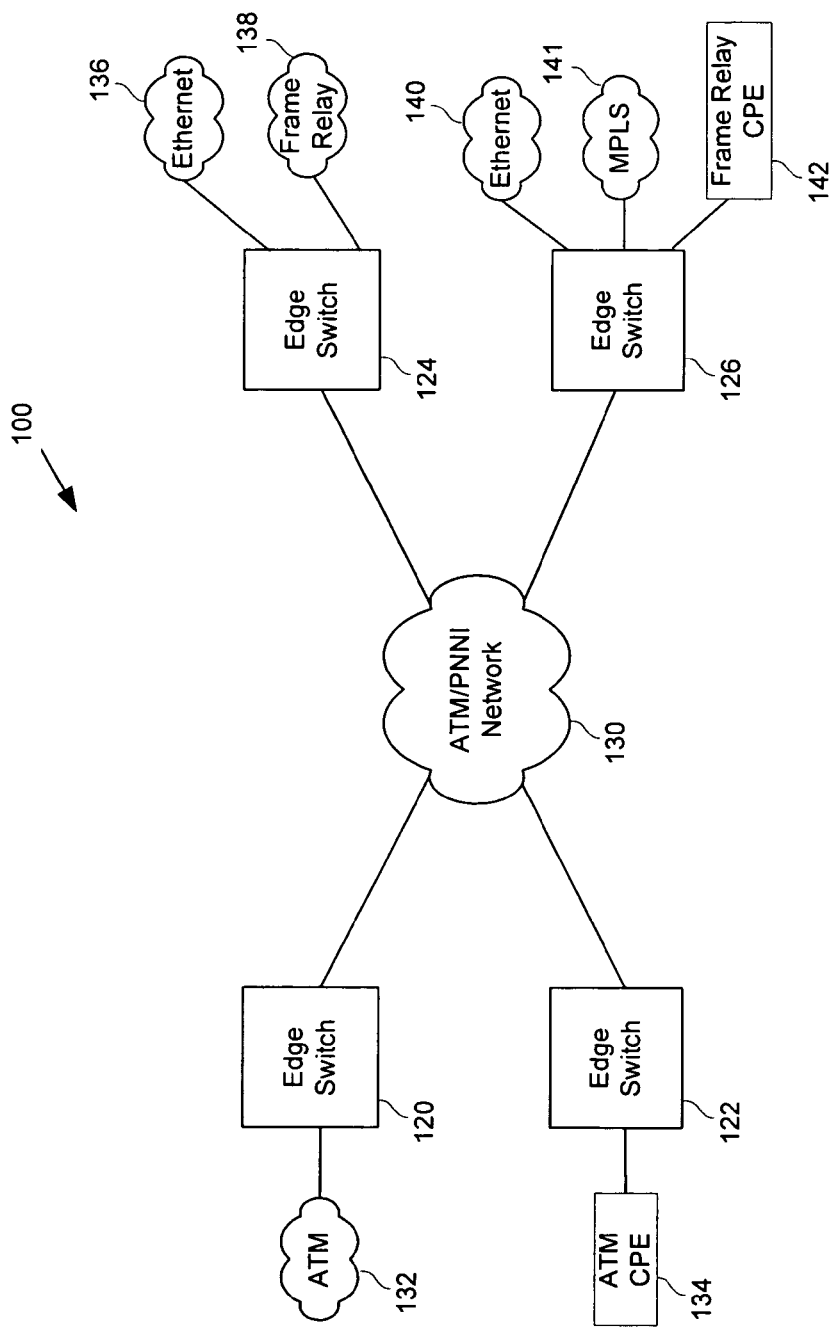
FIG. 1A is a network diagram illustrating a service provider's wide-area ATM network 100 providing end-to-end services between customer premises equipment (CPE) or customer networks.

It should be appreciated that the present invention can be implemented in numerous ways, including as a process, an apparatus, a system, or a computer readable medium such as a computer readable storage medium or a computer network wherein program instructions are sent over optical or electronic communication links. It should be noted that the order of the steps of disclosed processes may be altered within the scope of the invention.

A detailed description of one or more preferred embodiments of the invention is provided below along with accompanying figures that illustrate by way of example the principles of the invention. While the invention is described in connection with such embodiments, it should be understood that the invention is not limited to any embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

A method of establishing a cross connection on a network switch between a first interface or service endpoint participating in a first protocol and a second interface or service endpoint participating in a second protocol is disclosed. The method comprises establishing a so-called Virtual Service Endpoint (VSE) in the "middle" of the switch, to participate in both the first protocol by connecting to the first interface/service endpoint and the second protocol by connecting to the second interface/service endpoint, and to facilitate setting up forwarding table to cross connect between the first interface/service endpoint and the second interface/service endpoint. A VSE is one-to-one correspondent to a cross-connect over the switch. A VSE is designed as an internal mechanism in the network switch, not to be exposed to or accessible from the outside world. In one embodiment, the first interface/service endpoint participates in a first protocol-specific network and the second interface/service endpoint participates in a second protocol-specific network. A VSE maintains a certain "duality" by presenting itself as a first protocol-specific service endpoint to the first protocol-specific network, and presenting itself as a second protocol-specific service endpoint to the second protocol-specific network. In principle, a virtual service endpoint can present any protocol-specific service endpoint recognizable by any protocol to allow communication between any two disparate networks running different network protocols.

Although a VSE corresponds to a cross-connect through a network switch, it can be further divided into two "paired" half-VSEs, which can be either identical or different. In one embodiment, a half-VSE is identified by the following structure of three fields: [Connection Type, Index 1, Index2], where each field is 32 bits long, Connection Type indicates what protocol-specific connection this half-VSE represents, and Index1 and Index2 represent the standard identifiers for the protocol-specific connection. As examples, a half-VSE representing an ATM virtual service endpoint has the following structure: [ATM VC, VPI, VCI], and a half-VSE representing an MPLS virtual service endpoint has the following structure: [MPLS LSP, forward MPLS Label, backward MPLS Label]. In one embodiment, the protocol translation method using Canonic Packet Format described in U.S. patent application Ser. No. 10/646,340 may be used together with the virtual service endpoint. In one such embodiment, the data format representing a virtual service endpoint is a canonical packet format.

A forwarding table is an element in a network switch that facilitates making a cross connect between an ingress interface and an egress interface. When a packet belonging to a virtual connection arrives at an ingress interface of a network switch, a forwarding table specifies what virtual connection the packet belongs to at egress, and what egress interface the packet exits. A forwarding table is typically constructed as a multiple-column table where each row represents a cross-connect over the switch, and the first half-column represents entries (connection type, connection identifiers, etc.) for the service endpoint at the ingress interface for the cross-connect, and the second half-column represents entries (connection type, connection identifiers, etc.) for the service endpoint at the egress interface for the cross-connect. While the forwarding table always specifies cross-connects between two "real" service endpoints at an ingress interface and an egress interface respectively, the notion of a VSE introduces the concept of "virtual" service endpoints, and a virtual forwarding table, to enable a cross-connect between any two disparate ingress and egress service interfaces attaching to disparate networks.

More specifically, the method can be used in a network device such as an edge switch enabling customer services or a gateway switch interconnecting two disparate networks running different network protocols. An edge switch connects a network (for example, connecting to a backbone network) to a service endpoint (for example, connecting to a customer network, or a CPE). A gateway switch connects two disparate networks (for example, a metro/regional ATM network and a backbone MPLS network). In one embodiment, the method is in used in a switch with a pooling switch, as further described in U.S. patent application Ser. No. 10/447,825.

FIG. 2A is a block diagram illustrating a network 200 with edge switch 215. Network 200 is similar to network 100 modified to include edge switch 215, an Ethernet CPE 217 and a Frame Relay CPE 218. Edge switch 215 connects ATM/PNNI network 130 with Ethernet CPE 217 and Frame Relay CPE 218. Edge switch 215 includes a configured VSE 205 and forwarding table 210.

Edge switches 122 and 215 can communicate via PNNI signaling/routing protocol to connect ATM CPE 134 and Ethernet CPE 217 because VSE 205, associated with Ethernet CPE 217, presents itself as an ATM service endpoint to ATM network 130. Hence VSE 205 participates in PNNI signaling and routing protocols in ATM network 130. For example, if switch 215 receives a (AAL5) packet sent from ATM CPE 134 to Ethernet CPE 217, the packet arriving at the ATM trunk interface (attaching to ATM network 130) is forwarded to Ethernet CPE 217 based on forwarding table 210. The forwarding table 210 maps from the real ATM trunk interface to VSE 205, and then from VSE 205 to the real Ethernet interface connecting to Ethernet CPE 217.

FIG. 2B is a block diagram illustrating a network 220 with a gateway switch 235. Network 220 includes gateway switch 235 which connects ATM/PNNI network 130 with Ethernet network 140, MPLS network 141, and Frame Relay network 142. Gateway switch 235 includes VSE 225 and forwarding table 230.

Edge switch 120 and MPLS network 141 can communicate with each other via gateway switch 235 because VSE 225 presents itself (with its first half-VSE) as an ATM service endpoint to ATM network 130, and in the meantime, presents itself (with its second half-VSE) as an MPLS service endpoint toward MPLS network 141. For example, if gateway switch 235 receives a packet sent from an ATM endpoint on ATM network 132 to an MPLS service endpoint on MPLS network 141, the packet is forwarded to MPLS network 141 based on forwarding table 230. Forwarding table 230 forwards the packet from the real ingress interface (an ATM interface) attaching to ATM network 130 to first half-VSE of 225, and then from second half-VSE of 225 to the real egress interface (an MPLS/packet interface) attaching to MPLS network 141.

FIG. 3A is a diagram further illustrating edge switch 215 with a VSE 205 for performing edge service interworking. Edge switch 215 includes a first real interface 305 (which can be any type of service interface, e.g., Frame Relay, ATM, or Ethernet) and a second real interface 310, an ATM trunk interface, attaching to ATM network 130. VSE 205 includes a half-VSE 315 associated with first interface 305 and a half-VSE 320 associated with second interface 310. Half-VSE 315 presents itself to first interface 305 as an ATM interface, and half-VSE 320 presents itself to second interface 310 (and its attached ATM network 130) as an ATM service endpoint as well. Half-VSE 320 may participate in the PNNI signaling and routing protocols in the ATM network 130. Therefore, for providing an edge service interworking function, the two paired half-VSEs typically represent the same type of service endpoints: both half-VSEs 315 and 320 are virtual ATM service endpoints. In other embodiments, the virtual service endpoint may not be represented as two paired half-VSEs; it may be just one VSE.

FIG. 3B is a diagram, in principle, illustrating forwarding table 460 for edge switch 215. In this embodiment, edge switch 215 is configured to switch between first interface 305 which is a Frame Relay interface, and second interface 310 which is an ATM interface attached to ATM network 130. Forwarding table 460 includes two "virtual" forwarding tables 400 and 405, combined to form real forwarding table 460. Note that the two half virtual interfaces 412 and 414 are identical. Each row in the virtual forwarding table 400 specifies the association between a real service endpoint on Frame Relay interface 305 and a first half-VSE which is an ATM interface. Each row in the virtual forwarding table 405 specifies the association between a second half-VSE which is also an ATM interface and a real service endpoint on ATM interface 310. Each row in each virtual forwarding table associates a real service endpoint (in a real interface) with a half virtual service endpoint. Combining the two virtual forwarding tables 400 and 405 results in the real forwarding table which cross-connects between the Frame Relay interface 305 and the ATM interface 310.

Each row in the virtual forwarding table 400 includes entries for a first real service endpoint in first real Frame Relay interface 305 and entries for a first half-VSE. Entries of first half-VSE include the identifiers that are presented to first real Frame Relay interface 305. For example, if edge switch 215 receives a packet with an identifier [FR Connection ID1, DLCI1], the identifier for its associated first half-VSE is [ATM Connection ID1, VPI1, VCI1]. Identifier [ATM Connection ID1, VPI1, VCI1] is recognizable by ATM network 130, hence is able to participate in the PNNI signaling and routing in ATM network 130. As far as ATM network 130 can tell, the edge switch 215 and beyond is just ATM.

Each row in the virtual forwarding table 400 includes entries for a first real service endpoint in real interface 305 and entries for a first half-VSE. Entries of first half-VSE include the identifiers that are presented to first real interface 305. For example, if edge switch 215 receives a FR packet with an identifier [FR Connection ID1, DLCI1], the identifier for its associated first half-VSE is [ATM Connection ID1, VPI1, VCI1], and its paired second half-VSE also has the identifier [ATM Connection ID1, VPI1, VCI1], which is recognizable by ATM network 130, hence is able to participate in the PNNI signaling and routing in ATM network 130. As far as ATM network 130 can tell, edge switch 215 and all its service endpoints are just ATM. The arriving FR packet with identifier [FR Connection ID1, DLCI1] is forwarded to ATM network 130 with identifier [ATM Connection ID1, VPI4, VCI4].

FIG. 4A is a diagram further illustrating gateway switch 235 inter-connecting ATM network 130 and MPLS network 141 via a VSE 225. Gateway switch 235 includes a first real interface 335, an ATM interface, attaching to ATM network 130, and a second real interface 340, an MPLS packet interface, attaching to MPLS network 141. Virtual service endpoint 225 includes a half-VSE 345 associated with first real interface 335 and its attached ATM network 130, and a half-VSE 350 associated with second real interface 340 and its attached MPLS network 141. Half-VSE 345 presents itself to first interface 335 (and ATM network 130) as an ATM service endpoint, and half-VSE 350 presents itself to second interface 340 (and MPLS network 141) as an MPLS service endpoint. First half-VSE 345 is viewed as an ATM service endpoint participating in PNNI routing and signaling protocols in ATM network 130, while second half-VSE 350 is viewed as an MPLS service endpoint participating in MPLS routing and signaling protocols in MPLS network 141. Therefore, for providing gateway network interworking function, the two paired half-VSEs typically represent two different types of service endpoints: half-VSE 345 is a virtual ATM service endpoint, but half-VSE 350 is a virtual MPLS service endpoint. In other embodiments, the virtual service endpoint may not be represented as two half virtual service endpoints. The virtual service endpoint may be represented as two virtual service endpoints or represented in other ways to provide the functionality described herein.

FIG. 4B is a diagram, in principle, illustrating forwarding table 470 for gateway switch 235. Gateway switch 235 is attached to both ATM network 130 and MPLS network 141. Forwarding table 470 includes two "virtual" forwarding tables 420 and 425. In this embodiment, virtual forwarding table 420 specifies the association between three real service endpoints in first real ATM interface 305 (attaching to ATM network 130) and three (first) half-VSEs in gateway switch 235. The virtual forwarding table 425 specifies the association between three (second) half-VSEs and three real MPLS service endpoints in second real MPLS interface 340 (attaching to MPLS network 141). Each row in each virtual forwarding table associates a real service endpoint (in a real interface) with a half virtual service endpoint. Combining two virtual forwarding tables 420 and 425 results in the real forwarding table 470 which connects the real service endpoints in ATM interface 335 to the real service endpoints in MPLS interface 340, hence interconnects ATM network 130 and MPLS network 141.

Each row in the virtual forwarding table 420 includes entries for a first real service endpoint in first real ATM interface 335 and entries for a first half-VSE. Entries of first half-VSE include the identifiers that are presented to first real interface 335. For example, if gateway switch 235 receives a packet with an identifier [ATM Connection ID1, VPI1, VCI1], the identifier for its associated first half-VSE is [ATM Connection ID4, VPI4, VCI4]. Identifier [ATM Connection ID4, VPI4, VCI4] is recognizable by ATM network 130, hence is able to participate in the PNNI signaling and routing in ATM network 130. As far as ATM network 130 can tell, the gateway switch 235 and beyond is just ATM.

Each row in the virtual forwarding table 425 includes entries for a second real service endpoint in real interface 340 and entries for a second half-VSE. Entries of second half-VSE include the identifiers that are presented to second real interface 340. For example, if gateway switch 235 receives a (AAL5) packet with an identifier [ATM Connection ID1, VPI1, VCI1], the identifier for its associated second half-VSE is [MPLS Connection ID1, VC Label1 (Forward Direction), VC Label1 (Reverse Direction)], which is recognizable by MPLS network 141, hence is able to participate in the MPLS signaling and routing in MPLS network 141. As far as MPLS network 141 can tell, gateway switch 235 and beyond is just MPLS. The arriving (AAL5) packet with an identifier [ATM Connection ID1, VPI1, VCI1] from the ATM network 130 is forwarded to MPLS network 141 with identifier [MPLS Connection ID4, VC Label2 (Forward Direction), VC Label2 (Reverse Direction)].

FIG. 5 is a flowchart illustrating a method of establishing a connection for an edge switch for a service interworking application. A piece of software called connection manager in the switch is responsible for building a forwarding table for cross-connect over the switch. The connection manager maintains all the configuration information and keeps track of all connections and status. For establishing a circuit over the switch and attached network, two half-VSEs are configured in the switch, where the first half-VSE is configured to associate with the first real service endpoint by creating a new row in first virtual forwarding table (step 500), and the second half-VSE is configured to be associated with the first half-VSE (step 510). Network signaling SW participates in network signaling/routing (e.g., PNNI signaling for ATM network) using second half-VSE as service endpoint (step 520). When networking signaling reaches the "connected" state, the second real interface is located (the module where all signaling calls going through). The network signaling software sends a request to the connection manager to connect the second half-VSE with the second real interface by creating a new row in the second virtual forwarding table (step 530). Because of the association between the first half-VSE and the second half-VSE, the connection manager identifies the two rows in the two virtual forwarding tables, and make the association between the identified first real service endpoint and second real interface (step 540). The connection manager finally cross-connects the two resulting real interfaces to establish the data path through the switch (step 550).

FIG. 6 is a flowchart illustrating a method of releasing a connection for an edge switch for a service interworking application. Signaling software requests that second half-VSE is disconnected from the second real interface and the attached network (step 600). The connection manager removes second half-VSE's corresponding row in second virtual forwarding table (step 610). Based on the association between the first half-VSE and the second half-VSE, the connection manager locates first half-VSE in first virtual forwarding table (step 620), and then finds the first real service endpoint for the connection (step 630). The connection manager removes the corresponding row in the first virtual forwarding table and disconnects the data path between the two real service endpoints (step 640).

FIG. 7 is a flowchart illustrating a method of establishing a connection for a gateway network interworking application. A gateway switch connects two networks, the first network and the second network. The connection to each network is established independently. In one embodiment, each connection is established according to steps 500-550. A connection with the first network is established between the first half-VSE and first real interface attached to the first network (steps 700, 705, 710). For example, if the first network is an ATM network, the connection is established as either a source or destination SPVC, as if the SPVC was terminated to a fixed service endpoint (e.g., Frame Relay or ATM service endpoint) on the gateway switch. Similarly, a connection with the second network is established between the second half-VSE and second real interface attached to the second network (steps 715, 720, 725). For example, if the second network is an MPLS network, the connection is established by LDP, using Martini VC for establishing connections over MPLS tunnels, again as if the Martini connection was terminated to a fixed service endpoint (e.g., Frame Relay or ATM service endpoint) on the gateway switch. The connection manager is informed of the status of two connections from signaling software which signals two connections toward two networks, respectively. When either connection is made (i.e., when the corresponding call reaches the "connected" state), the connection manager checks whether the other side is in the "connected" state (step 730). If yes, the connection manager cross-connects two identified real interfaces to establish a data path over the gateway switch to inter-connect the two connections through two networks; if no, the connection manager waits for the other side to reach the "connected" state (step 740).

FIG. 8 is a flowchart illustrating a method of releasing a connection for a gateway network interworking application. When either connection is released, the connection manager releases the cross-connect of the data path over the gateway switch (steps 800, 805, 810). Each side of the connection handles the failure of the connection in its respective network. For example, for an ATM network, the failure of the connection is handled like a transmission failure on a PVC. The call remains in the "connected" state from a network signaling point of view. OAM F5 cells are transmitted by the switch to indicate that the connection is not available. For an MPLS network, the LDP label of the Martini VC would be withdrawn, resulting in the release of the VC. These conditions are removed when the connection is reestablished.

Other embodiments of the methods described above may perform different and/or additional steps. In addition, the steps may be performed in different orders.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of establishing a connection between a first endpoint participating in a first protocol and a second endpoint participating in a second protocol, the method including:

establishing a virtual service endpoint to participate in the first protocol on a network device coupled to the first endpoint and the second endpoint, wherein the virtual service endpoint is configured to provide interworking between the first protocol and the second protocol, wherein the virtual service endpoint includes a first half virtual service endpoint and a second half virtual service endpoint, the first half virtual service endpoint to participate in the first protocol and the second half virtual service endpoint to participate in the second protocol; and using a forwarding table to forward communication to the second endpoint via the virtual service endpoint, the forwarding table to include:

a mapping from a first interface associated with the first protocol to the first half virtual service endpoint;

a mapping from the first half virtual service endpoint to the second half virtual service endpoint; and a mapping from the second half virtual service endpoint to a second interface associated with the second protocol.

2. A method as recited in claim 1, wherein the first interface associated with the first protocol comprises a first real interface for the first endpoint and the second interface associated with the second protocol comprises a second real interface for the second endpoint.

3. A method as recited in claim 1, wherein using the forwarding table to forward communication to the second endpoint includes:
coupling the first half virtual service endpoint to the first interface associated with the first protocol;
locating the first half virtual service endpoint in the forwarding table and finding the second half virtual service endpoint; and
coupling the second half virtual service endpoint to the second interface associated with the second protocol, wherein coupling the first half and the second half virtual service endpoints to the first interface and the second interface couples a data path between the first endpoint and the second endpoint.

4. A method as recited in claim 1, wherein to forward communication to the second endpoint includes:
establishing a connection between the first interface and the first half virtual service endpoint;
establishing a connection between the second interface and the second half virtual service endpoint;
and cross connecting a data path between the two connections.

5. A method as recited in claim 1, wherein the first half virtual service endpoint has an identifier associated with the first interface and the second half virtual service endpoint has an identifier associated with the second interface.

6. A method as recited in claim 1, wherein the first protocol or the second protocol are associated with one of ATM, Ethernet, Frame Relay, or MPLS.

7. A method as recited in claim 1, wherein the network device is an edge switch or a gateway switch.

8. A method as recited in claim 1, wherein the first half virtual service endpoint and the second half virtual service endpoint are identical.

9. A method as recited in claim 1, wherein the first endpoint is not aware of the second protocol and the second endpoint is not aware of the first protocol.

10. A method as recited in claim 1, wherein:
the virtual service endpoint includes the first endpoint and the second endpoint;
the first endpoint includes the first interface and the first half virtual service endpoint; and
the second endpoint includes the second interface and the second half virtual service endpoint.

11. A method as recited in claim 10, wherein the virtual service endpoint is located on the network device.

12. A method as recited in claim 1, wherein the virtual service endpoint is located on the network device.

13. A network device for establishing a connection between a first endpoint participating in a first protocol-specific network and a second endpoint participating in a second protocol-specific network, the network device including:
a virtual service endpoint configured to:
provide interworking between the first protocol-specific network and the second protocol-specific network, wherein the virtual service endpoint is to present a first protocol-specific service endpoint to the first protocol-specific network and present a second protocol-specific service endpoint to the second protocol-specific network; and
use a forwarding table to forward communication from the first endpoint to the second endpoint through the virtual service endpoint, the forwarding table to include:
a mapping from a first interface associated with the first protocol-specific network to the first protocol-specific network;
a mapping from the first protocol-specific endpoint to the second protocol-specific endpoint; and
a mapping from the second protocol-specific endpoint to a second interface associated with the second protocol-specific network;
wherein the network device is connected to coupled with the first endpoint and the second endpoint.

14. A network device as recited in claim 13, wherein the first protocol-specific network or the second protocol-specific network are associated with one of ATM, Ethernet, Frame Relay, or MPLS.

15. A network device as recited in claim 13, wherein to use the forwarding table to forward communication from the first endpoint to the second endpoint includes the virtual service endpoint further configured to:
establish a connection between the first interface and the first protocol-specific service endpoint;
establish a connection between the second interface and the second protocol-specific service endpoint;
and cross connect a data path between the two connections.

16. A computer program product for establishing a connection between a first endpoint participating in a first protocol and a second endpoint participating in a second protocol, the computer program product being embodied in a non-transitory computer readable medium and comprising computer instructions to:
establish a virtual service endpoint to participate in the first protocol on a network device coupled to the first endpoint and the second endpoint, wherein the virtual service endpoint is configured to provide interworking between the first protocol and the second protocol, wherein the virtual service endpoint includes a first half virtual service endpoint and a second half virtual service endpoint, the first half virtual service endpoint to participate in the first protocol and the second half virtual service endpoint to participate in the second protocol; and
use a forwarding table to forward communication to the second endpoint via the virtual service endpoint, the forwarding table to include:
a mapping from a first interface associated with the first protocol to the first half virtual service endpoint;
a mapping from the first half virtual service endpoint to the second half virtual service endpoint; and
a mapping from the second half virtual service endpoint to a second interface associated with the second protocol.

17. A computer program product as recited in claim 16, wherein the first protocol or the second protocol are associated with one of ATM, Ethernet, Frame Relay, or MPLS.

18. A computer program product as recited in claim 16, wherein to use the forwarding table to forward communication to the second endpoint includes instructions to:
couple the first half virtual service endpoint to the first interface associated with the first protocol;

locate the first half virtual service endpoint in the forwarding table and find the second half virtual service endpoint; and couple the second half virtual service endpoint to the second interface associated with the second protocol, wherein to couple the first half and the second half virtual service endpoints to the first interface and the second interface couples a data path between the first endpoint and the second endpoint.

19. A method of establishing a connection between a first endpoint participating in a first protocol-specific network and a second endpoint participating in a second protocol-specific network, the method including:

establishing a virtual service endpoint with a network device coupled with the first endpoint and the second endpoint, the virtual service endpoint configured to provide interworking between the first protocol-specific network and the second protocol-specific network, wherein the virtual service endpoint presents a first protocol-specific service endpoint to the first protocol-specific network and presents a second protocol-specific service endpoint to the second protocol-specific network; and using a forwarding table to forward communication from the first endpoint to the second endpoint via the virtual service endpoint, the forwarding table to include:

a mapping from a first interface associated with the first protocol-specific network to the first protocol-specific service endpoint;

a mapping from the first protocol-specific service endpoint to the second protocol-specific service endpoint; and a mapping from the second protocol-specific service endpoint to a second interface associated with the second protocol-specific network.

20. A method as recited in claim 19, wherein the first protocol-specific network or the second protocol-specific network are associated with one of ATM, Ethernet, Frame Relay, or MPLS.

21. A method as recited in claim 19, wherein using the forwarding table to forward communication from the first endpoint to the second endpoint includes:

establishing a connection between the first interface and the first protocol-specific service endpoint;

establishing a connection between the second interface and the second protocol-specific service endpoint;

and cross connecting a data path between the two connections.

* * * * *